(12) United States Patent
Takei

(10) Patent No.: US 8,355,154 B2
(45) Date of Patent: Jan. 15, 2013

(54) COMPUTER-READABLE RECORDING MEDIUM HAVING PRINTER DRIVER RECORDED THEREON, COPYING MACHINE, AND MULTI-FUNCTION PERIPHERAL

(75) Inventor: Noriyuki Takei, Shiojiri (JP)

(73) Assignee: Seiko Epson Corporation, Tokyo (JP)

(*) Notice: Subject to any disclaimer, the term of this patent is extended or adjusted under 35 U.S.C. 154(b) by 297 days.

(21) Appl. No.: 12/756,054

(22) Filed: Apr. 7, 2010

(65) Prior Publication Data

US 2010/0259786 A1 Oct. 14, 2010

(30) Foreign Application Priority Data

Apr. 8, 2009 (JP) ................. 2009-093666

(51) Int. Cl.
*G06F 3/12* (2006.01)
*G06K 15/00* (2006.01)

(52) U.S. Cl. ........ 358/1.15; 358/1.1; 358/1.4; 358/1.13; 358/1.14

(58) Field of Classification Search .................. None
See application file for complete search history.

(56) References Cited

U.S. PATENT DOCUMENTS

| | | | |
|---|---|---|---|
| 6,914,687 B1 * | 7/2005 | Hosoda et al. ............... 358/1.1 |
| 2006/0132845 A1 * | 6/2006 | Itaki et al. ................... 358/1.15 |
| 2007/0103714 A1 * | 5/2007 | Ushiku ......................... 358/1.14 |
| 2008/0131181 A1 * | 6/2008 | Saitoh et al. ..................... 400/76 |
| 2008/0218816 A1 * | 9/2008 | Sakuramata et al. ......... 358/537 |
| 2009/0059274 A1 * | 3/2009 | Tomita ......................... 358/1.15 |
| 2009/0303545 A1 * | 12/2009 | Kawamoto .................. 358/1.18 |
| 2011/0267652 A1 * | 11/2011 | Saitoh et al. ................ 358/1.15 |

FOREIGN PATENT DOCUMENTS

| JP | 2002-007089 A | 1/2002 |
|---|---|---|
| JP | 2004-102478 A | 4/2004 |

\* cited by examiner

*Primary Examiner* — Satwant Singh

(74) *Attorney, Agent, or Firm* — Kilpatrick Townsend & Stockton LLP

(57) ABSTRACT

A computer-readable recording medium having a printer driver recorded thereon, the printer driver causing a computer to operate as a computer including: a setting reception unit that displays a first user interface and receives settings of print settings; and a print data generation unit that generates print data according to the set print settings, wherein, when settings of a plurality of print copies are received via the first user interface, the setting reception unit displays a second user interface and receives settings for dividing the number of print copies into groups per an arbitrary number of copies, wherein, when an instruction for settings print settings to one of the groups is received via the second user interface, the setting reception unit displays a third user interface and receives settings of the print settings of the corresponding group.

9 Claims, 11 Drawing Sheets

COMPUTER-READABLE RECORDING MEDIUM HAVING PRINTER DRIVER RECORDED THEREON, COPYING MACHINE, AND MULTI-FUNCTION PERIPHERAL

BACKGROUND

1. Technical Field

The present invention relates to a computer-readable recording medium having a printer driver recorded thereon, a copying machine, and a multi-function peripheral, and more particularly, to a technique of performing printing or copying to make a plurality of copies.

2. Related Art

A printer driver, a coping machine, and a multi-function peripheral may have a function of performing printing or copying to make a plurality of sheets.

For example, the printer driver receives settings of print copies via a user interface (hereinafter, referred to as "UI") screen displayed on a computer. In addition, the printer driver generates print data according to the received number of print copies and transmits the generated print data to a printer to perform printing to make the received number of copies. The copying machine and the multi-function peripheral also perform printing according to a number of print copies set by a user via a driver as the printer does. In addition, copying may be performed according to a number of copies for copying set by the user through a touch panel or the like.

During the printing or the copying to make the plurality of copies, the same print settings or the same copy settings are used for all the copies, and output results of all the copies are the same.

As a technique for allowing an arbitrary number of copies to be given different output results from those of the total number of copies designated, there is a printer driver of receiving settings for dividing the total number of copies set by a user into copies of color printing and copies of monochrome printing from the user and then collectively performing color and monochrome printing (see URL (http://www.samsung.com/sec/consumer/detail/detail.do?group=printersmultifunction&type=printersmultifunction&subtype=colorlaserprinter&model_cd=CLP-605 NDK)).

However, in recent years, there have been various demands from users on printing and copying to make a plurality of copies. For example, there is a demand to set different print settings (for example, print quality, color, paper size, print direction, print tray, paper type, two-sided printing, and the like) per an arbitrary number of copies from among the total designated number of copies, collectively perform printing (for example, by pushing a start button once), and obtain different print results per an arbitrary number of copies. There is the same demand for copying.

From this point of view, in a related art as described above, only two print settings including color and monochrome print settings can be set. Therefore, various needs of the users as described above cannot be satisfied.

SUMMARY

An advantage of some aspects of the invention is that it provides a technique for satisfying various demands of users on printing or copying to make a plurality of copies.

According to an aspect of the invention, there is provided a computer-readable recording medium having a printer driver recorded thereon, the printer driver causing a computer to operate as a computer including: a setting reception unit that displays a first user interface and receives settings of print settings; and a print data generation unit that generates print data according to the set print settings, wherein, when settings of a plurality of print copies are received via the first user interface, the setting reception unit displays a second user interface and receives settings for dividing the number of print copies into groups per an arbitrary number of copies, wherein, when an instruction for setting print settings to one of the groups is received via the second user interface, the setting reception unit displays a third user interface and receives settings of the print settings of the corresponding group, and wherein the print data generation unit generates print data according to the print settings per each of the groups set via the first and third user interfaces.

Here, in the computer-readable recording medium having a printer driver recorded thereon, when settings of a plurality of print copies are received via the first user interface, a predetermined button may be set to be available, and when a selection of the button is received, the second user interface may be displayed.

In addition, in the computer-readable recording medium having a printer driver recorded thereon, the first and third user interfaces may have sections for receiving the same print settings.

In addition, in the computer-readable recording medium having a printer driver recorded thereon, the setting reception unit may set a reception of a predetermined part of the print settings on the third user interface to be unavailable.

According to another aspect of the invention, there is provided a copying machine including: a setting reception unit that displays a first user interface and receives settings of copy settings; and a copy control unit that controls copying to be performed by a scanner unit and a printer unit according to the set copy settings, wherein, when settings of a plurality of copies for copying are received via the first user interface, the setting reception unit displays a second user interface and receives settings for dividing the number of copies for copying into groups per an arbitrary number of copies, wherein, when an instruction for setting copy settings to one of the groups is received via the second user interface, the setting reception unit displays a third user interface and receives settings of the copy settings of the corresponding group, and wherein the copy control unit controls copying according to the copy settings per each of the groups set via the first and third user interfaces.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, exemplary embodiments of the invention will be described.

Figure 1:
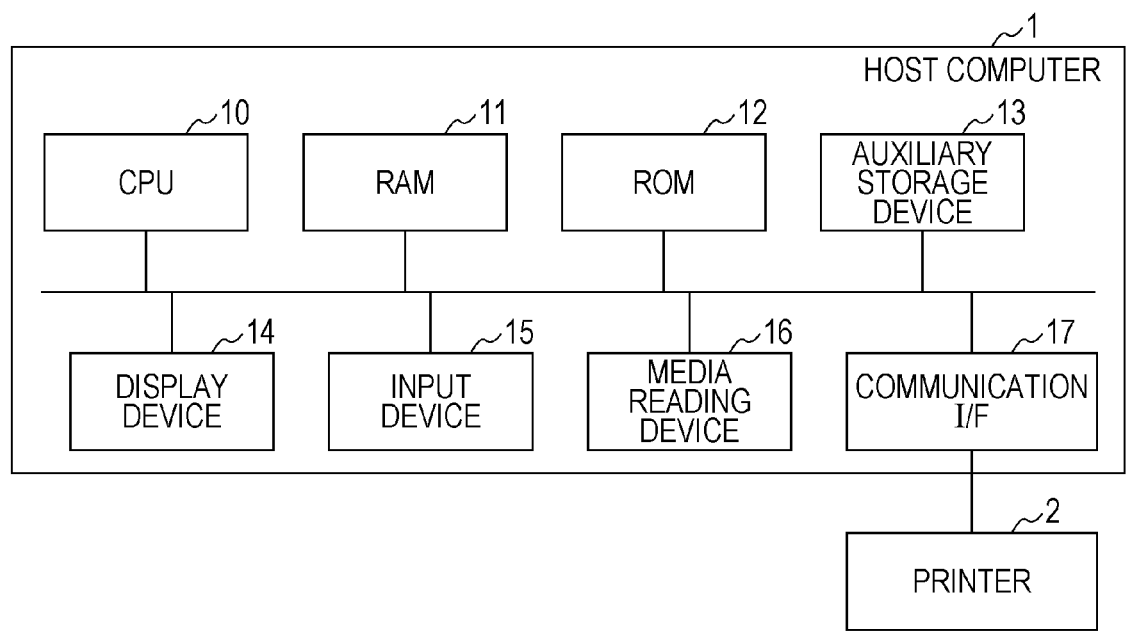
FIG. 1 is a diagram schematically illustrating a configuration of hardware of a host computer which is an example of an embodiment of the invention.

FIG. 1 is a diagram schematically illustrating a configuration of hardware of a host computer which is an example of an embodiment of the invention.

As illustrated in FIG. 1, a host computer 1 is a general computer including: for example, a CPU 10 for executing various operations; a RAM 11 storing programs or data executed by the CPU 10; a ROM 12 storing programs or data needed for starting in advance; an auxiliary storage device 13 such as a hard disk; a display device 14 such as an LCD displaying a UI screen or the like; an input device 15 such as a keyboard, mouse, and the like; a media reading device 16 for reading information from a portable recording medium having portability such as a CD-ROM; and a communication interface (I/F) 17 for communicating with an external device via a network such as a LAN.

According to this embodiment, the host computer 1 is connected to a printer 2 via a network such as a LAN. In addition, the host computer 1 instructs the printer 2 to perform printing. Therefore, a printer driver program (not shown) for controlling the printer 2 is installed on the host computer 1. The host computer 1 may be directly connected to the printer 2 via a USB or the like.

The printer 2 performs printing according to print data transmitted from the host computer 1. The printer 2 is, for example, an ink jet-type color printer. A laser-type page printer may also be used.

Only the main components of the configurations of the host computer 1 and the printer 2 are described according to the features of the invention, and the invention is not limited by the above-mentioned configurations. In addition, configurations of a general host computer or a printer are not excluded.

Figures 2, 3:
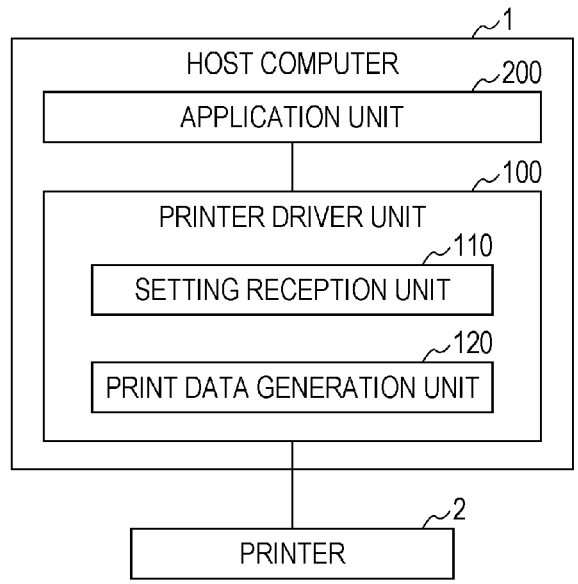
FIG. 2 is a block diagram illustrating an example of a functional configuration of the host computer.
FIG. 3 is a diagram illustrating an example of a job management table.

FIG. 2 is a block diagram illustrating an example of a functional configuration of the host computer 1.

As illustrated in FIG. 2, the host computer 1 includes a printer driver unit 100. In addition, the host computer 1 includes an OS unit (not shown) and an application unit 200.

The printer driver unit 100 is implemented by, for example, executing a predetermined printer driver program loaded on the RAM 11 by the CPU 10 from the auxiliary storage device 13. The OS unit and the application unit 200 may be implemented by, for example, executing a predetermined OS program or an application program loaded on the RAM 11 by the CPU 10 from the auxiliary storage device 13.

The printer driver program is, for example, downloaded from an external server on a network such as Internet to be installed or updated. Of course, the printer driver program may be read from a recording medium such as a CD-ROM by the media reading device 16 to be installed or updated.

The printer driver unit 100 performs, for example, a display control process for displaying and controlling various UI screens of the printer driver, an input control process for controlling an operation of a user input via the UI screens, a print data generation process for generating print jobs and the like including data received from the application unit 200 to be printed, and a transmission process for transmitting the print data to the printer 2. Accordingly, the printer driver 100 includes a setting reception unit 110 and a print data generation unit 120.

When the printer driver unit 100 is started, the setting reception unit 110 displays a UI screen 500 (see FIGS. 5 and 6, and detailed description will be provided later) for setting reference (main) print settings on the display device 14. In addition, the printer driver unit 110 receives settings of various print settings via the input device 15.

The setting reception unit 110 displays a UI screen (see FIGS. 7 to 9, and detailed description will be provided later) 600 for adding modified (modified from the reference) print settings to an arbitrary number of copies when it receives settings of a plurality of print copies on the UI screen 500. In addition, the setting reception unit 110 receives additions of modified print settings per an arbitrary number of copies from among the print copies set on the UI screen 500.

Specifically, the setting reception unit 110 receives settings for dividing the print copies (the total print copies) set on the UI screen 500 into a plurality of groups. For example, when the total number of print copies is 10, additions of first modified print settings for three copies, second modified print settings for two copies, and third modified print settings for two copies may be received. The remaining three copies are left as copies in the reference print settings.

In addition, according to this embodiment, the number of modified print settings that can be added is limited (for example, four). Of course, modified print settings may be applied for each copy.

The setting reception unit 110 displays a UI screen 700 (see FIGS. 10 and 11, and detailed description will be provided later) for setting modified print settings designated by the user after receiving the additions of the modified print settings per an arbitrary number of copies on the UI screen 600. Then, the setting reception unit 110 receives settings of various print settings.

The setting reception unit 110 stores and manages the print settings (the reference print settings and the modified print settings) received as described above. When the setting reception unit 110 receives a print instruction from the user, it requires the print data generation unit 120 to generate print data according to the print settings.

The setting reception unit 110 has a job management table 1100 as illustrated in FIG. 3 in order to store and manage print settings per an arbitrary number of copies. The job management table 1100 may store a plurality of entries of print jobs. FIG. 3 illustrates a state where an entry of a print job is added.

A job ID 1110 is allocated to the entry of the print job. In addition, the entry of the print job includes an entry of a plurality of print settings (in this embodiment, one reference settings and four modified settings, total five settings) determined in advance. The entry of each of the print settings includes a setting ID 1120 for specifying print settings, the number of copies 1130 by which printing is performed in the corresponding print settings, and print settings information 1140 indicating contents of the corresponding print settings.

The setting reception unit 110 adds an entry of a job to the job management table 1100, for example, when the printer driver unit 100 is started via a print setting screen of the application unit 200. Then, the setting reception unit 110 sets the job ID 1110 determined by the predetermined method.

Next, the setting reception unit 110 sets a default value of the entry of each of the print settings. For example, the number of copies 1130 of the reference settings is set to "1" or a number of copies designated by the application unit 200, and the print settings information 1140 of the reference settings is set to predetermined default print settings. In addition, the number of copies 1130 of the modified settings is set to "0", and the print settings information 1140 is not set to particular data.

In addition, when the setting reception unit 110 receives settings of the number of print copies on the UI screen 500, it changes the number of copies 1130 of the reference settings to the designated number of print copies. In addition, when an addition of modified print settings by an arbitrary number of copies is received on the UI screen 600, the setting reception unit 110 subtracts the designated number of copies from the number of copies 1130 of the reference settings and sets the designated number of copies to the number of copies 1130 of the entries of the print settings corresponding to the added modified print settings. In addition, the contents of the print settings information 1140 of the entry of the reference settings are copied to the print settings information 1140 of the entry of the added modified settings.

In addition, when the setting reception unit 110 receives a change in the added modified print settings on the UI screen 700, it changes the print settings information 1140 of the entry of the print settings corresponding to the changed modified print settings.

Of course, a configuration of the job management table 1100 is only an example and is not limited to the above-mentioned configuration. In addition, a method of managing the print settings is not limited to a method using a table.

Returning to FIG. 2, when the print data generation unit 120 receives a print request from the setting reception unit 110, it acquires a plurality of printing settings (the reference printing settings and the modified printing settings) included in a job to be printed and the number of copies of each of the print settings from the job management table 1100 of the setting reception unit 110. In addition, for example, the print data generation unit 120 acquires the designated data to be printed from the application unit 200 and generates print data (print job) including an instruction indicating a number of copies according to the print settings per each of the acquired print settings. In addition, the print data generation unit 120 transmits sequential print data to the printer 2 to sequentially perform printing based on the print data.

In addition, in the above description, the setting reception unit 110 sets print settings per an arbitrary number of copies for a single print job instructing printing to make a plurality of copies. Then, the print data generation unit 120 generates print data (print job) including an instruction indicating a number of copies per each of the print settings and transmits the print data to the printer 2. The printer 2 performs printing to make the number of copies designated for each piece of the print data.

However, the invention is not limited by the above-mentioned manner as long as the printer 2 changes print settings per an arbitrary number of copies to perform printing. For example, the print data generation unit 120 may transmit a print job for each of the generated print settings to the printer 2 as a single print job. Otherwise, the print data generation unit 120 may generate print data for each copy so as to sequentially transmit the print data to the printer 2. Alternatively, the setting reception unit 110 transmits a plurality of print settings, the number of copies for each of the print settings, and data to be printed to the printer 2 to allow the printer 2 to generate print data and perform printing.

The components described above are classified according to main processing contents for the convenience of description of the configuration of the host computer 1 and the printer driver unit 100. The invention is not limited by a method of classifying the components and the names of the components. The configurations of the host computer 1 and the printer driver unit 100 may be classified into a greater number of components according to the processing contents. Otherwise, a single component may be divided in order to perform more processes. Alternatively, a process of each component may be executed by a single piece of hardware or a plurality of pieces of hardware.

Next, particular processes implemented by the host computer 1 and the printer driver unit 100 will be described.

Figure 4:
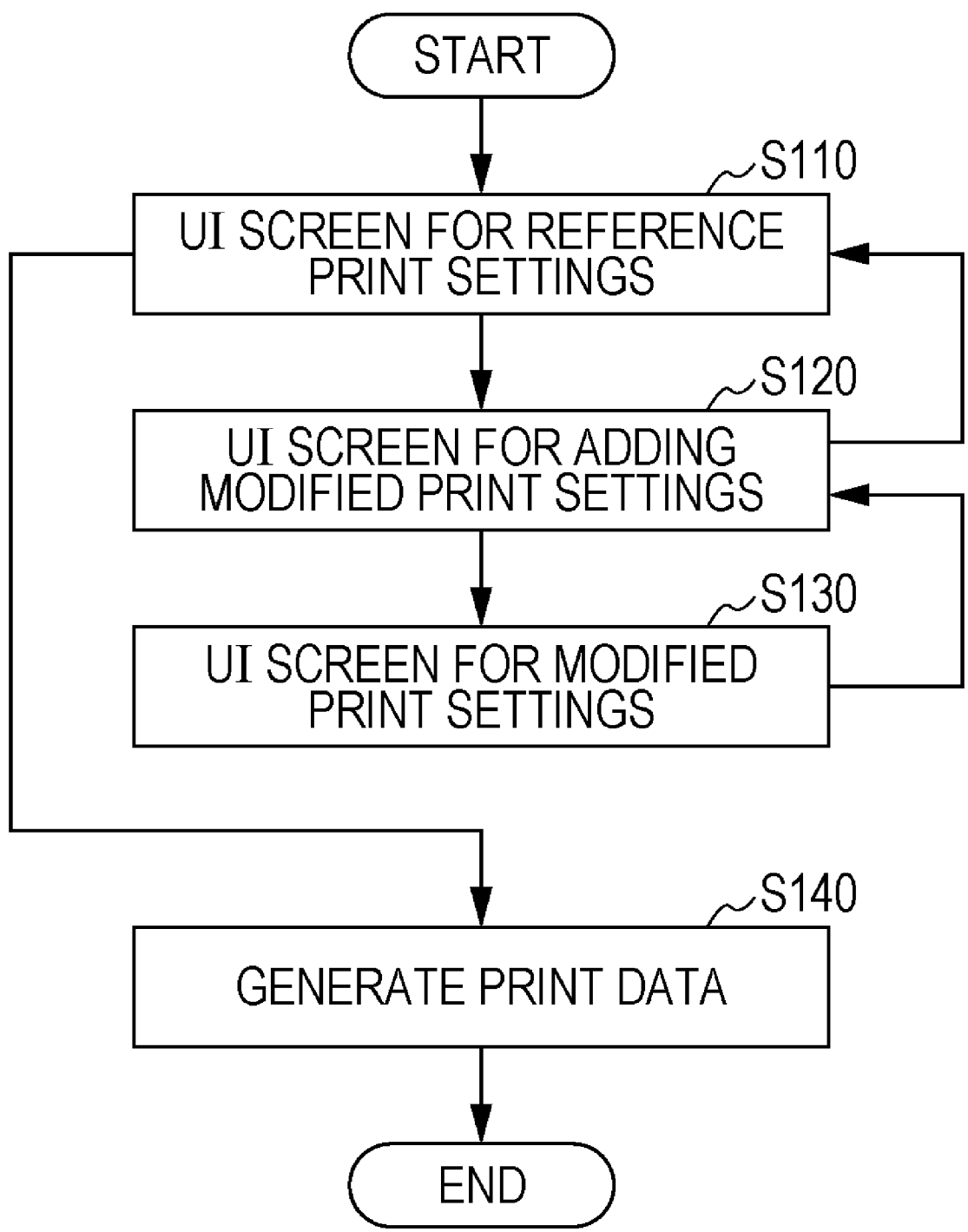
FIG. 4 is a flowchart illustrating an example of a setting process for performing print settings per an arbitrary number of copies.

FIG. 4 is a flowchart illustrating an example of a setting process for performing print settings per an arbitrary number of copies. The flow is started after starting the printer driver unit 100. In addition, the printer driver unit 100 is started on, for example, a UI screen of print settings of the application unit 200 when the user instructs printing.

In Step S110, the setting reception unit 110 displays the UI screen for the reference print settings and receives settings of the reference print settings.

Figure 5:
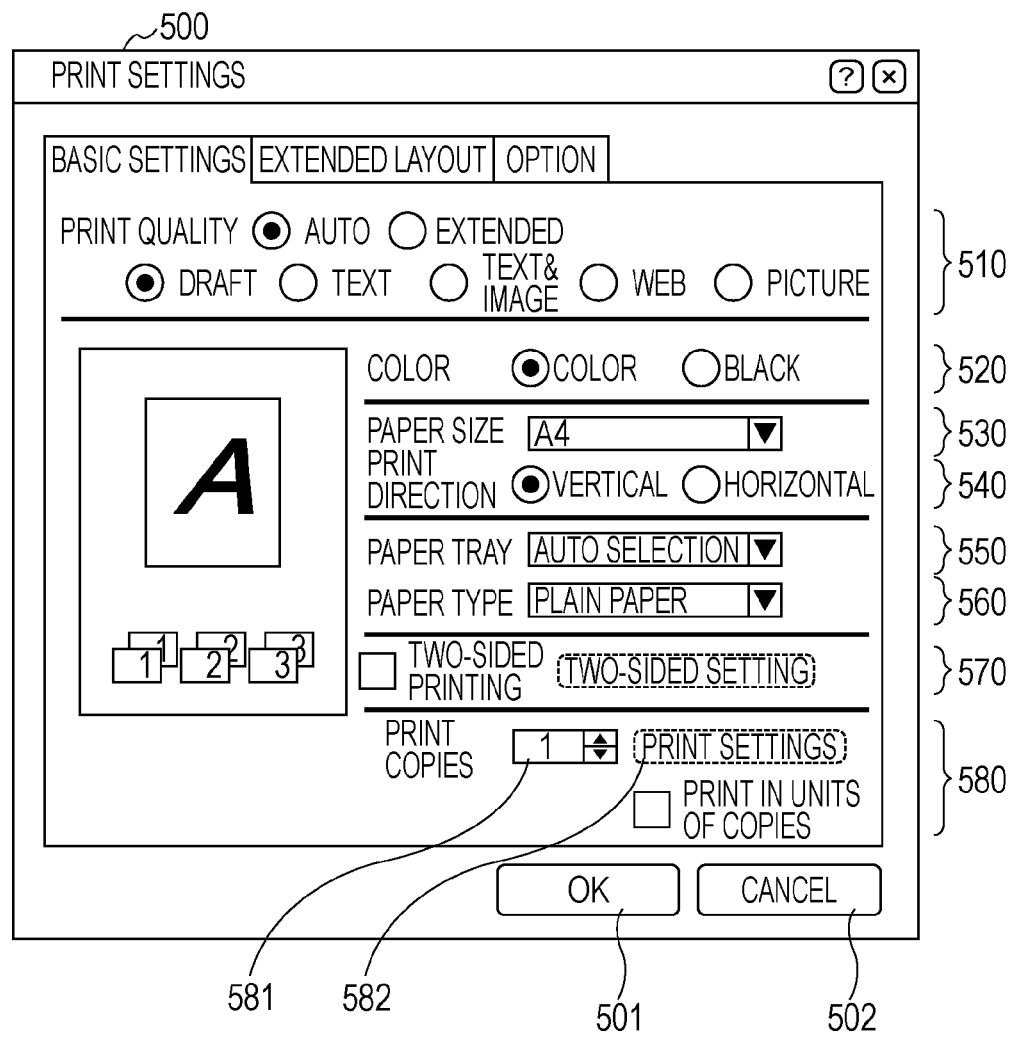
FIG. 5 is a diagram illustrating an example of a UI screen for setting reference print settings.

Specifically, the setting reception unit 110 displays the UI screen 500 as illustrated in FIG. 5. In this embodiment, the UI screen 500 includes a reference settings screen, an extended layout screen, and an option screen which can be switched by a tab. In addition, the UI screen 500 includes an OK button 501 for applying print settings used for generating print data by a number of copies corresponding to the reference print settings or a plurality of copies on the UI screen 500, and a cancel button 502 for stopping the application of the print settings.

The reference settings screen includes: a print quality section 510 for setting print quality; a color section 520 for setting print color; a paper size section 530 for setting a paper size, a print direction section 540 for setting a print direction, a paper tray section 550 for setting a paper tray; a paper type section 560 for setting a paper type; a two-sided printing section 570 for setting settings about two-sided printing; and a number of copies printing section 580 for setting settings about the number of print copies. Detailed description of the extended layout screen and the option screen will be omitted.

Here, the number of copies printing section 580 includes a number of copies section 581 for setting a number of print copies and a print settings button 582 for displaying the UI screen 600 described later to add modified print settings. In the example illustrated in FIG. 5, since the number of copies section 581 is set to the number of copies "1", the setting reception unit 110 sets the print settings button 582 to be unavailable so as not to be operated by the user (grayed out, and a display of the print settings button 582 may be erased.)

Of course, the configuration of the UI screen 500 for setting the reference print settings is only an example, and the invention is not limited by the configurations.

The setting reception unit 110 displays the UI screen 500 as described above and adds one entry of a print job to the job management table 1100. In addition, when the entry of the same job already exists, the entry is not added. Next, the setting reception unit 110 receives changes in various print settings on the UI screen 500. When the changed print settings are received, contents of the print settings information 1140 of the entry of the reference settings are changed.

Here, when the number of copies of the number of copies section 581 is changed to a plural number, the setting reception unit 110 changes the number of copies 1130 of the entry of the reference settings to the designated number of copies. For example, as illustrated by a transition from FIG. 5 to FIG. 6, when the number of copies of the number of copies section 581 is changed to "8", the setting reception unit 110 changes the number of copies 1130 of the entry of the reference settings to "8". In addition, since the number of copies is set to the plural number, the setting reception unit 110 sets the print settings button 582 to be valid so as to be operated by the user.

In addition, when the print settings button 582 is selected by the operation of the user in a state where the number of copies of the number of copies section 581 is changed to the plural number, the setting reception unit 110 progresses the process to Step S120. When the OK button 501 is selected by the operation of the user, the setting reception unit 110 erases the display of the UI screen 500 and progresses the process to Step S140.

In Step S120, the setting reception unit 110 displays an UI screen for adding the modified print settings and receives the addition of the modified print settings.

Figure 7:
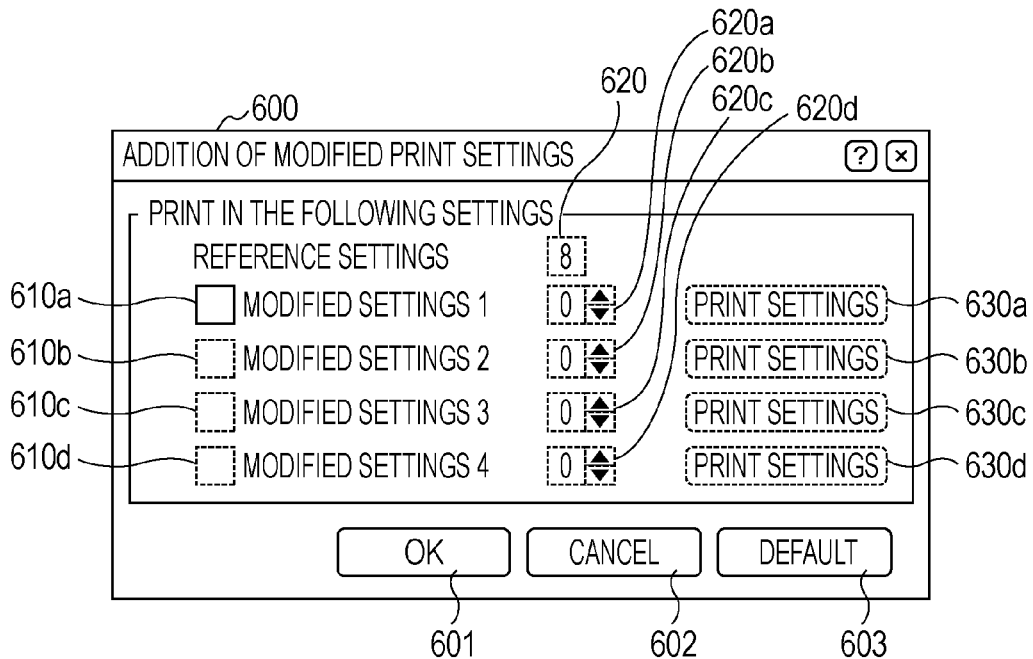
FIG. 7 is a diagram illustrating an example of a UI screen for adding modified print settings per an arbitrary number of copies.

Specifically, the setting reception unit 110 displays the UI screen 600 as illustrated in FIG. 7. In this embodiment, the UI screen 600 includes: a reference settings number of copies section 620 for displaying a number of print copies of the reference settings; modified settings addition sections 610a to 610d for adding the first to fourth modified settings; modified settings number of copies sections 620a to 620d for setting numbers of print copies of the first to fourth modified settings; print settings buttons 630a to 630d for settings print settings of the first to fourth modified settings; an OK button 601 for applying the settings on the UI screen 600 to print settings used for generating print data; a cancel button 602 for stopping the application of the print settings; and a default button 603 for making the whole settings of the first to fourth modified settings unavailable (that is, returning only to the reference settings).

In FIG. 7, since the number of copies section 581 (FIG. 6) is set to the number of copies "8", the setting reception unit 110 displays "8" on the reference settings number of copies section 620. In addition, as the first modified setting can be added (can be selected by the user), the modified settings addition section 610a is set to be valid. In addition, the modified settings addition sections 610b to 610d, the modified settings number of copies sections 620a to 620d, and the print settings buttons 630a to 630d are set to be unavailable so as not to be selected by the user.

Of course, the configuration of the UI screen 500 for setting the reference print settings is only an example, and the invention is not limited by the configuration.

The setting reception unit 110 receives an addition of the modified print settings on the UI screen 600 described above.

In addition, when the modified settings addition section 610a is selected, the setting reception unit 110 subtracts "1" from the number of copies 1130 of the entry of the reference settings and displays a value of the number of copies 1130 on the reference settings number of copies section 620. Then, the number of copies 1130 of the entry of the first modified settings is set to "1", and the value of the number of copies 1130 is displayed on the modified settings number of copies section 620a. In addition, the print settings information 1140 of the entry of the reference settings is copied to the print settings information 1140 of the entry of the first modified settings. In addition, the modified settings number of copies section 620a and the print settings button 630a are set to be valid. In addition, the modified settings addition section 610b is set to be valid.

Thereafter, when the number of copies of the modified settings number of copies section 620a is increased by the operation of the user, the increment is subtracted from the number of copies 1130 of the entry of the reference settings, and the increment of the number of copies 1130 of the entry of the first modified settings. For example, as illustrated in FIG. 8, since the modified settings number of copies section 620a is set to the number of copies "2", the setting reception unit 110 displays "6" on the reference settings number of copies section 620.

In addition, when the modified settings addition section 610b is selected in the state where the modified settings addition section 610a is selected, the setting reception unit 110 subtracts "1" from the number of copies 1130 of the entry of the reference settings and displays a value of the number of copies 1130 on the reference settings number of copies section 620. In addition, the number of copies 1130 of the entry of the second modified settings is set to "1", and the value of the number of copies 1130 is displayed on the modified settings number of copies section 620b. In addition, the print settings information 1140 of the entry of the reference settings is copied to the print settings information 1140 of the entry of the second modified settings. In addition, the modified settings number of copies section 620b and the print settings button 630b are set to be valid. In addition, the modified settings addition section 610c is set to be valid.

Figure 8:
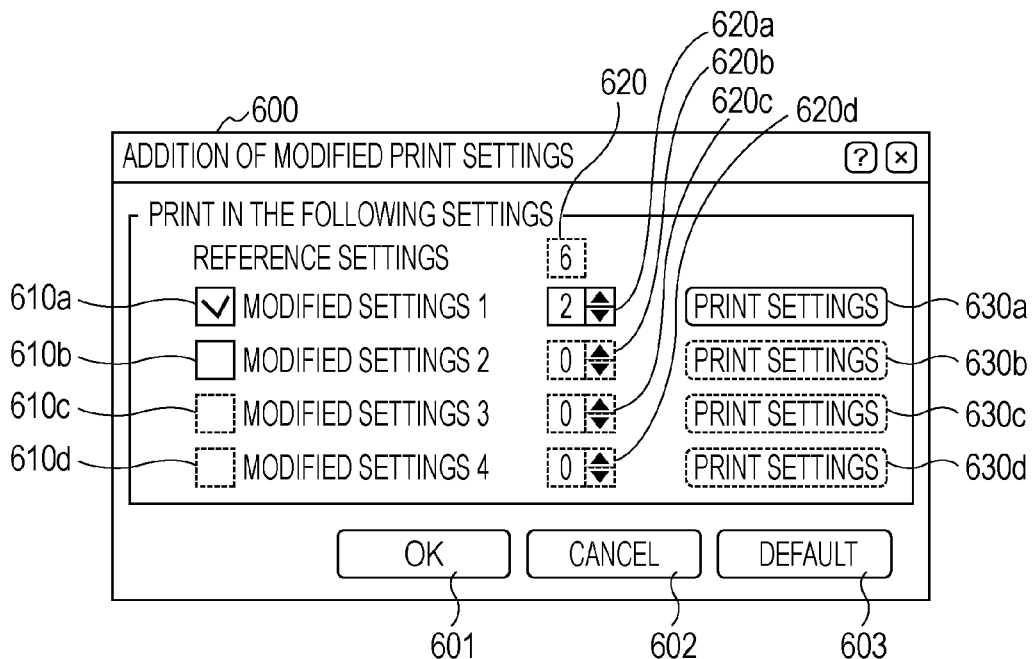
FIG. 8 is a diagram illustrating an example of the UI screen for adding modified print settings per an arbitrary number of copies.
Figure 9:
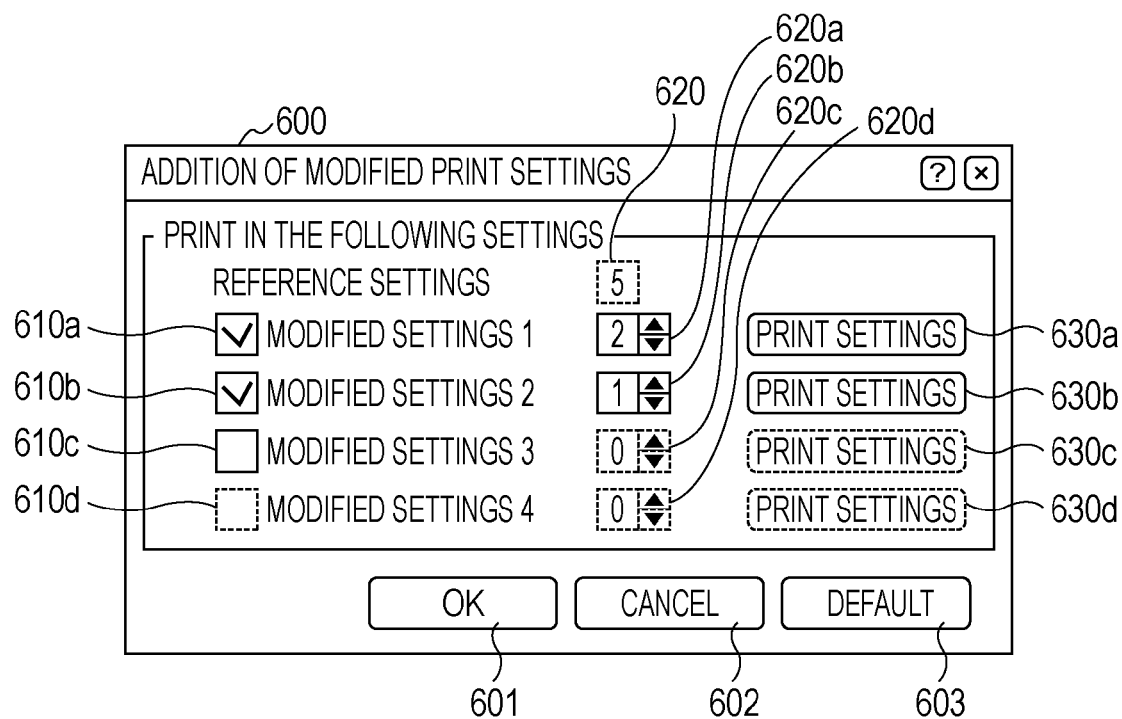
FIG. 9 is a diagram illustrating an example of the UI screen for adding modified print settings per an arbitrary number of copies.

For example, as illustrated by a transition from FIG. 8 to FIG. 9, since the modified settings number of copies section 620b is set to the number of copies "1", the setting reception unit 110 displays "5" on the reference settings number of copies section 620.

As described above, the first to fourth modified settings may be added sequentially from the first modified settings. When one of the print settings buttons 630a to 630d is selected by the operation of the user in the state where one or more of the modified settings addition sections 610a to 610d are selected, the setting reception unit 110 progresses the process to Step S130. When the OK button 601 is selected by the operation of the user, the setting reception unit 110 erases the display of the UI screen 600 and progresses the process to Step S110.

In Step S130, the setting reception unit 110 displays a UI screen for setting the modified print settings and receives settings of the modified print settings.

Figure 10:
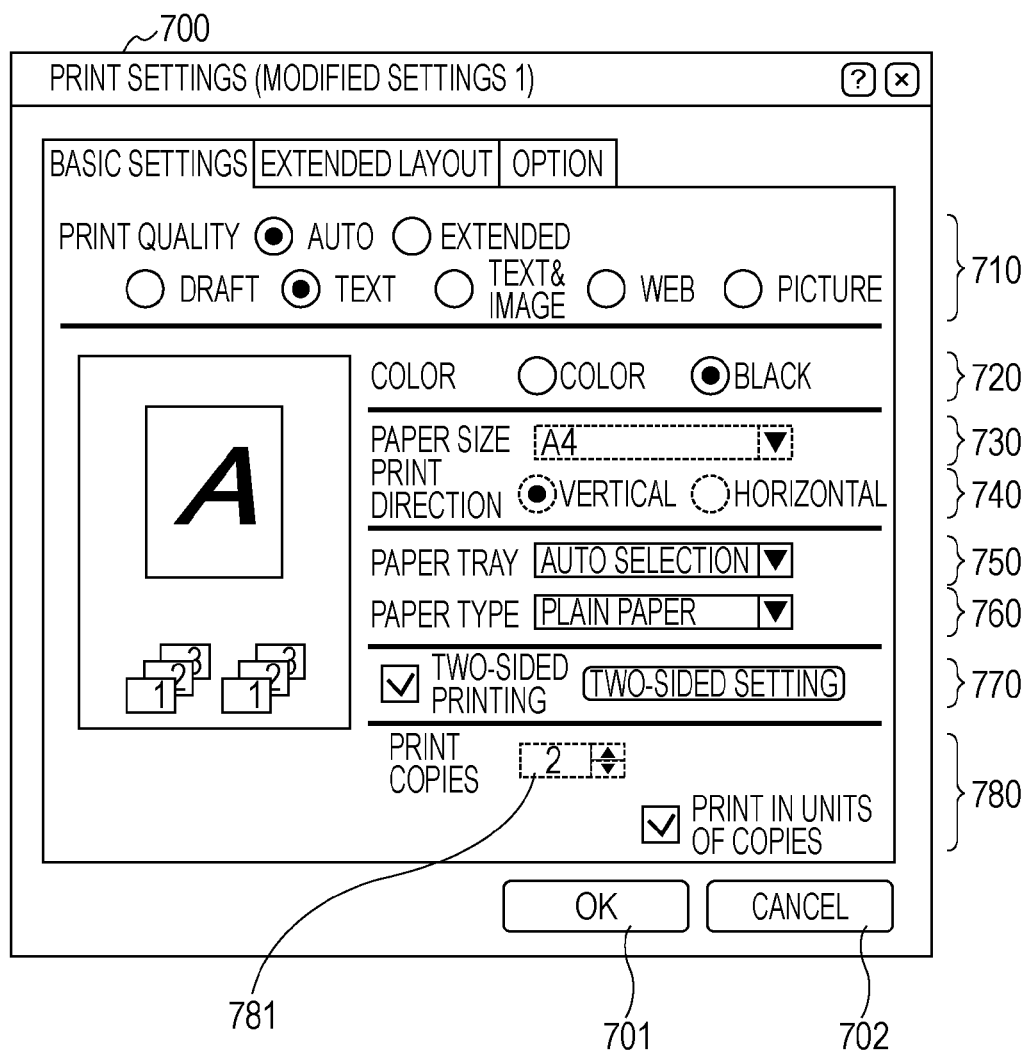
FIG. 10 is a diagram illustrating an example of a UI screen for setting modified print settings.
Figure 11:
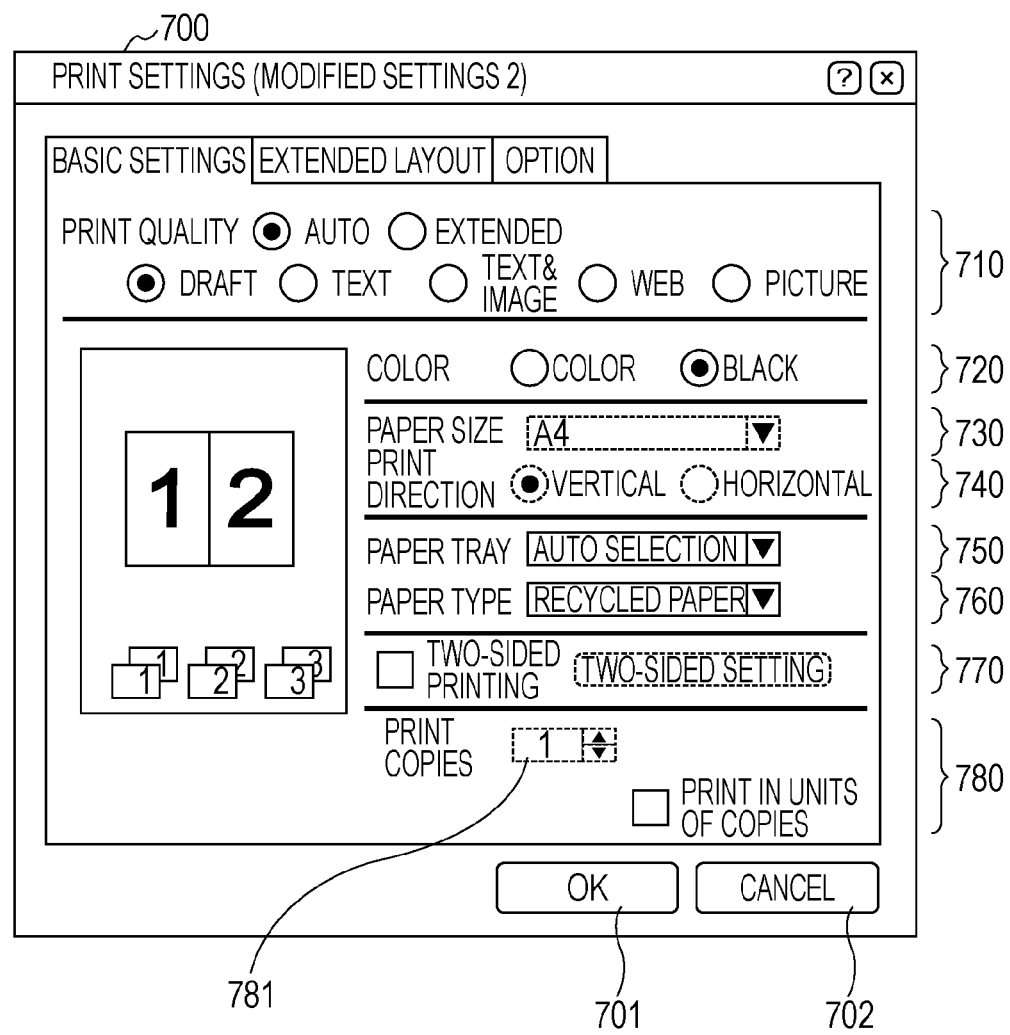
FIG. 11 is a diagram illustrating an example of the UI screen for setting modified print settings.

Specifically, the setting reception unit 110 displays the UI screen 700 as illustrated in FIGS. 10 and 11. In addition, the UI screen 700 of FIG. 10 is displayed when the print settings button 630a of the first modified settings on the UI screen 600 (FIG. 9) is selected by the operation of the user. In addition, the UI screen 700 of FIG. 11 is displayed when the print settings button 630b of the second modified settings on the UI screen 600 (FIG. 9) is selected by the operation of the user.

Figure 6:
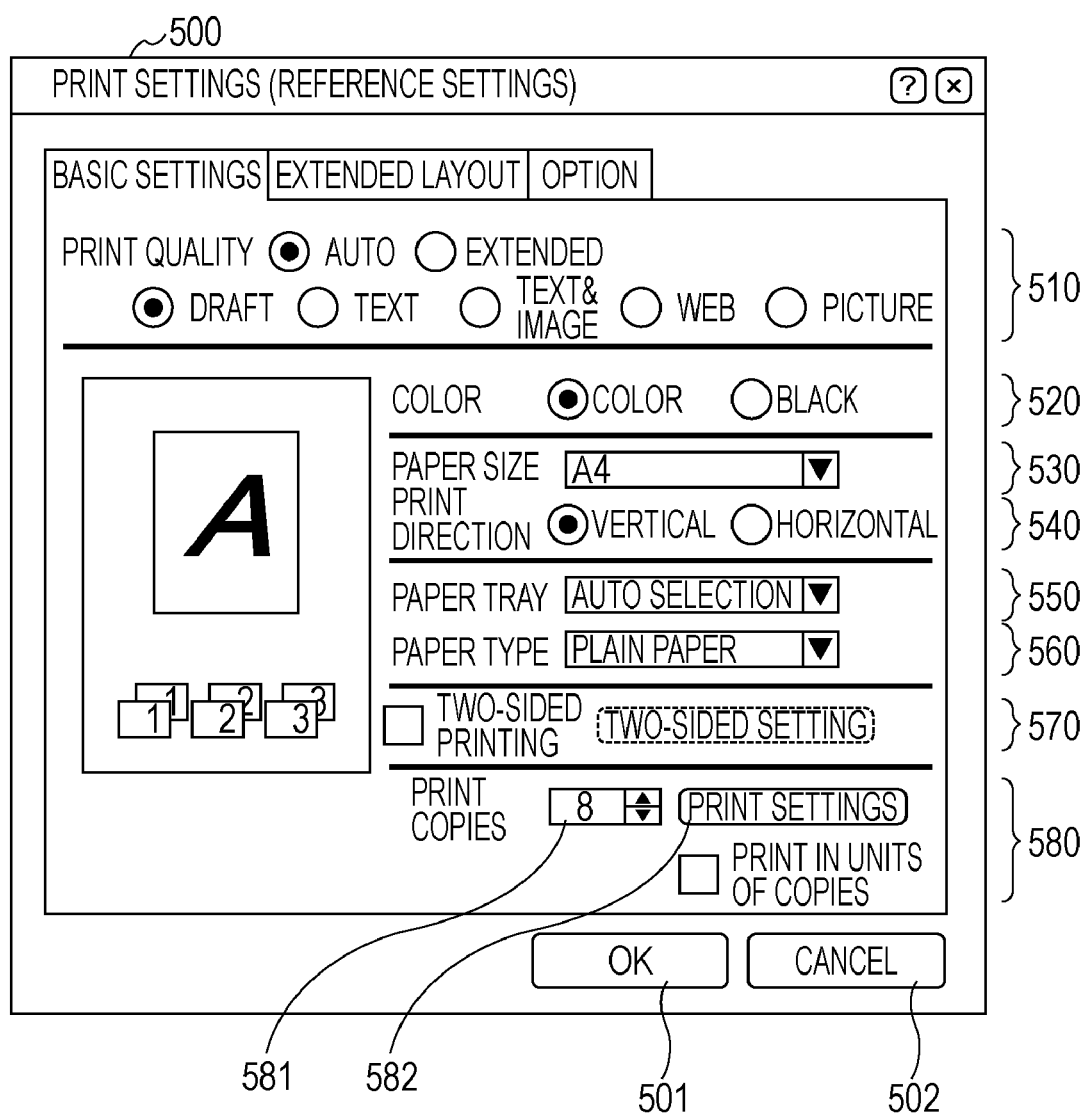
FIG. 6 is a diagram illustrating an example of the UI screen for setting reference print settings.

In this embodiment, the UI screen 700 has a similar configuration to the UI screen 500 (FIGS. 5 and 6). A different thing is that the UI screen 700 does not have the print settings button 582. In addition, the OK button 701 is a button for applying the modified print settings on the UI screen 700 to the print settings used for generating the corresponding print data.

Here, the setting reception unit 110 allows settings per an arbitrary number of copies from among the print settings to be different and sets sections for setting predetermined print settings in which the printer 2 cannot perform printing to be unavailable. For example, in FIGS. 10 and 11, a paper size section 730 and a print direction section 740 are set to be unavailable. That is, in this example, the printer 2 has such a specification that the printer 2 cannot perform printing to make an arbitrary number of copies in modified settings in which a paper size and a paper direction are different from those of the reference settings. Of course, print setting sections to be unavailable are determined by the specification of the printer 2, so that the invention is not limited by the description.

In addition, the setting reception unit 110 sets a number of copies section 781 to be unavailable. This is because the number of print copies of the modified settings can be changed only from the modified settings number of copies section 620a of the UI screen 600.

Of course, the configuration of the UI screen 700 for setting the reference print settings is only an example, and the invention is not limited by the configuration.

The setting reception unit 110 displays the UI screen 700 described above and receives changes in various print settings. When the changed print settings are received, contents of the print settings information 1140 of the entry of the corresponding modified settings are changed.

For example, on the UI screen 700 of FIG. 10, settings of a print quality section 710, a color section 720, a two-sided printing section 770, and a number of copies printing section 780 (print in units of copies) are changed from the reference settings (FIG. 6). The setting reception unit 110 applies the changes to the print settings information 1140 of the entry of the first modified settings. In addition, on the UI screen 700 of FIG. 11, settings of the color section 720, the paper type section 760, and an allocated printing section (not shown) are changed from the reference settings (FIG. 6). The setting reception unit 110 applies the changes to the print settings information 1140 of the entry of the second modified settings.

When the OK button 701 is selected by the operation of the user, the setting reception unit 110 erases the display of the UI screen 700 and progresses the process to Step S110.

In Step S140, the print data generation unit 120 generates print data. Specifically, the print data generation unit 120 acquires the entries of the reference settings and the modified settings included in the entries of the job to be printed from the job management table 1100. In addition, for example, the print data generation unit 120 acquires the designated data to be printed from the application unit 200. Then, the print data generation unit 120 generates print data including an instruction indicating the number of copies 1130 according to the print settings information 1140. Thereafter, the print data generation unit 120 transmits the generated print data to the printer 2 and performs printing based on the print data. Then, the flow is ended.

Only the main processes of the flow are described according to the features of the invention, and the invention does not exclude other processes. In addition, each process unit of the flow is obtained by dividing the flow according to main processing contents for the convenience of description of the processes of the host computer 1 and the printer driver unit 100. Therefore, the invention is not limited by a method of dividing the process units and names of the processes. In addition, the processes of the host computer 1 and the printer driver unit 100 may be divided into a greater number of process units according to the processing contents. Furthermore, a single process unit may be divided so as to include a more number of processes.

The embodiment of the invention has been described above. According to the embodiment, it is possible to satisfy various needs of the user when printing is performed to make a plurality of copies.

Next, another embodiment of the invention will be described. In this embodiment, in a copying machine, modified copy settings per an arbitrary number of copies from among the total number of copies for copying are received.

Figure 12:
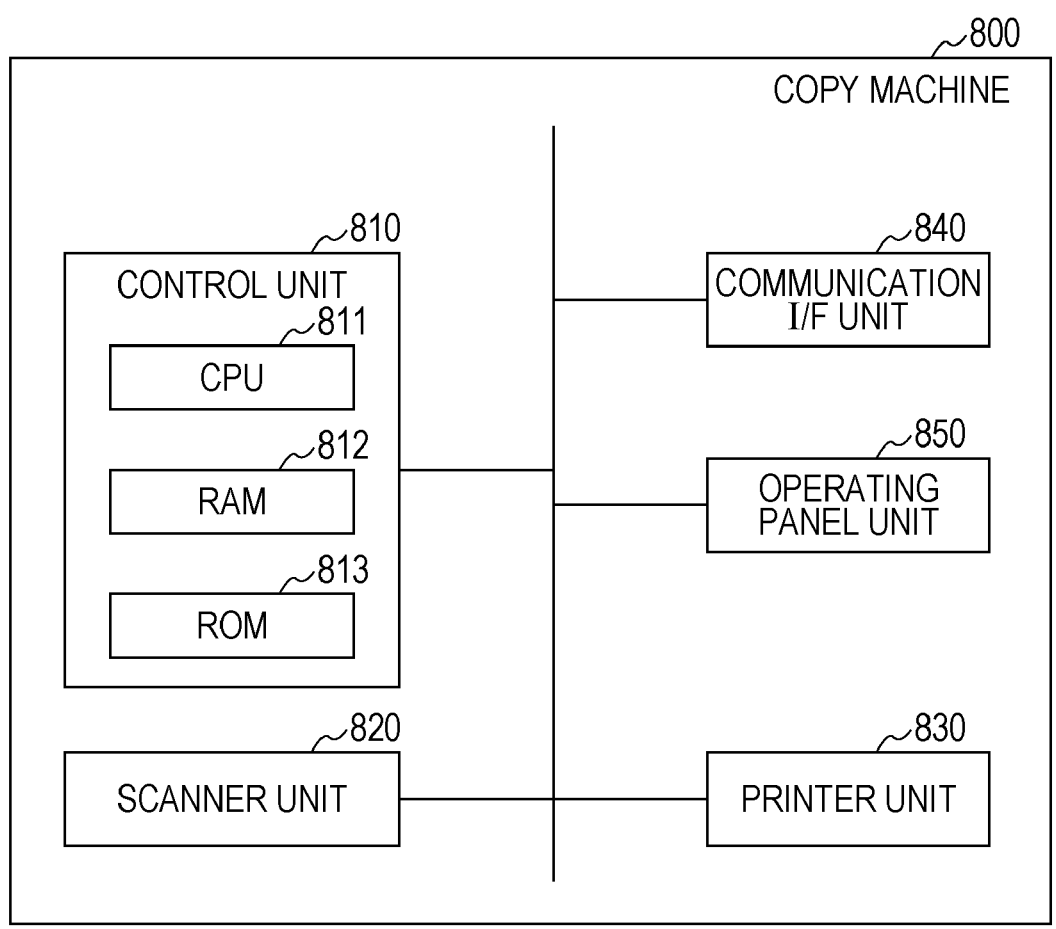
FIG. 12 is a diagram schematically illustrating a configuration of a copying machine which is an example of another embodiment of the invention.

FIG. 12 is a diagram schematically illustrating a configuration of a copying machine which is an example of the another embodiment of the invention.

As illustrated in FIG. 12, a copying machine 800 is a general copying machine including a control unit 810, a scanner unit 820, a printer unit 830, a communication I/F unit 840, and an operating panel unit 850. Of course, a configuration of the copying machine 800 is not limited thereto. For example, as a storage unit for storing data to be printed, a non-volatile storage device such as a hard disk may be provided.

The control unit 810 is a unit for controlling each of the units and implementing various functions of the copying machine 800. The control unit 810 includes, for example, a CPU 811 for performing various operations, a RAM 812 for storing programs or data executed by the CPU 811, a ROM 813 for storing programs and data needed for starting in advance, and the like.

The control unit 810 performs, for example, a display control process for displaying various UI screens on the operating panel unit 850 to receive copy settings and the like, an input control process for receiving an operation of the user on the UI screen by the operating panel unit 850, and the like. In addition, the control unit 810 controls a reading process for reading a document using the scanner unit 820 or controls a printing process for printing read image data using the printer unit 830 according to the copy settings set on the UI screens. In addition, the control unit 810, for example, may receive data to be printed via the communication I/F unit 840 and instruct the printer unit 830 to print the received data. In addition, the control unit 810, for example, may store image data read by the scanner unit 820 as a predetermined file (for example, document data such as PDF) in a hard disk or a portable storage medium.

Processes of the control unit 810 may be implemented by, for example, executing a predetermined control program loaded on the RAM 812 from the ROM 813 by the CPU 811. Of course, the processes thereof may be implemented by a dedicated circuit (for example, ASIC).

The scanner unit 820 is a unit for reading documents placed on a platen (not shown) and generating image data. The scanner unit 820 includes, for example, a light source, a carriage, a scanning motor, a lens, a CCD sensor, an A/D converter, an image processing circuit (all are not shown), and the like. Documents may be read using an ADF.

The printer unit 830 is a unit for printing image data sent from the scanner unit 820 or the control unit 810. The printer unit 830 includes an image processing circuit, a paper feed tray, a paper discharge unit, a cartridge, a photosensitive unit, a transfer unit, a fixing unit (all are not shown), and the like. Of course, the printer unit 830 is not limited to a laser-type paper printer as described above and may be an ink jet-type printer.

The communication I/F unit 840 is a unit for communicating with an external device on a network such as a LAN.

The operating panel unit 850 is a unit for receiving an instruction of the user by an operation of the user. The operating panel unit 850 may be configured by, for example, a display and a so-called touch panel which is mounted on a side of a displaying surface of the display and transmits a displaying screen (all are not shown). The touch panel is configured by, for example, a pressure-sensitive or capacitive input detection element. In addition, the operating panel unit 850 includes buttons (for example, a copy start button) for executing various functions or hard switches such as a keyboard (all are not shown).

The operating panel unit 850 detects a touch operation of the user on the touch panel and outputs the touch operation to the control unit 810 along with a touch position. In addition, the operating panel unit 850 detects an operation of the user on the hard switches and outputs the operation to the control unit 810. In addition, the operating panel unit 850 displays various UI screens for receiving copy settings and the like according to the demands from the control unit 810. Of course, a configuration of the operating panel unit 850 is not limited thereto.

Only the main components of the configuration of the copying machine 800 are described above for the convenience of description of the features of the invention, and the invention is not limited by the configuration. In addition, a configuration of a general copying machine is not excluded.

Characteristic processes implemented by the copying machine 800 and the control unit 810 will be described.

Figure 13A:
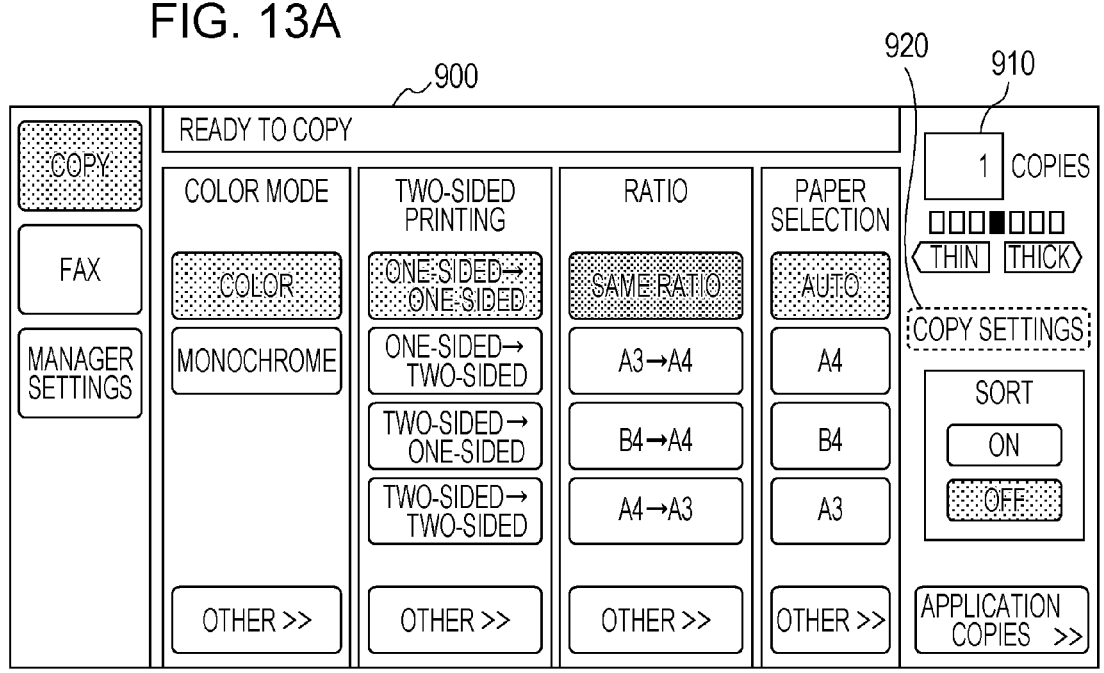
FIGS. 13A and 13B are diagrams illustrating an example of a UI screen for setting reference copy settings.
Figure 13B:
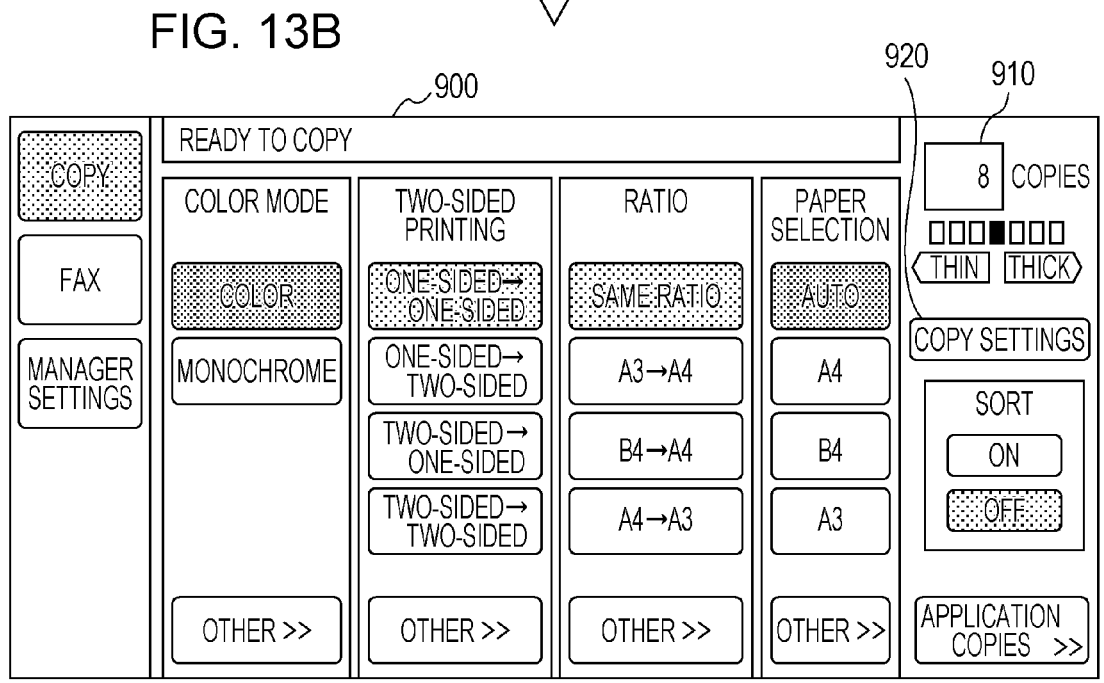

The control unit 810 displays a UI screen 900 for setting reference copy settings as illustrated in FIGS. 13A and 13B on the operating panel unit 850. In addition, the control unit 810 receives settings of the various copy settings via the operating panel unit 850.

In this embodiment, the UI screen 900 includes: a color mode section for setting a color mode; a two-sided printing section for setting settings about two-sided printing; a ratio section for setting a copy ratio; a paper selection section for selecting a paper; a number of copies section 910 for displaying a number of copies for copying set by the keyboard or the like; a density section for setting a printing density; a sort section for setting a sort; and the like.

Here, the UI screen 900 includes a copy settings button 920 for displaying a UI screen for adding modified copy settings. Since the number of copies section 910 is set to a number of copies "1" in the state illustrated in FIG. 13A, the control unit 810 sets the copy settings button 920 to be unavailable so as not to be operated by the user (grayed out, and a display of the copy settings button 920 may be erased).

Of course, a configuration of the UI screen 900 for setting the reference copy settings is only an example, and the invention is not limited by the configuration.

When the number of copies of the number of copies section 910 is changed to a plural number by an operation using the keyboard or the like. For example, as illustrated by a transition from FIG. 13A to FIG. 13B, when the number of copies of the number of copies section 910 is changed to "8", the control unit 810 sets the copy settings button 920 to be available so as to be operated by the user.

When the copy settings button 920 is selected by an operation of the user, the control unit 810 displays the UI screen for adding modified copy settings and receives an addition of the modified copy settings. The UI screen for adding the modified copy settings, for example, may have a configuration having the same items (setting sections) as those of the UI screen 600 described with reference to FIG. 7.

When the copy settings button 920 for setting several modified copy settings is selected by an operation of the user in a state where one or more modified copy settings are added on the UI screen for adding the modified copy settings, the control unit 810 displays the UI screen for settings the modified copy settings and receives settings of the modified copy settings. The UI screen for the modified copy settings has a similar configuration to that of the UI screen 900 (FIGS. 13A and 13B). A different thing is that the copy settings button 920 is not included.

Here, the control unit 810 sets sections for setting predetermined copy settings in which copying cannot be performed by the copying machine 800 as settings are different from each other per an arbitrary number of copies from among the copy settings to be unavailable. Of course, copy setting sections to be unavailable are determined according to a specification of the copying machine 800. In addition, the control unit 810 sets a change in the number of copies of the number of copies section 910 to be unavailable (to make an input from the keyboard or the like unavailable).

The control unit 810 displays the various UI screens as described above on the operating panel unit 850 to receive the reference settings and the modified settings. In addition, the control unit 810 controls the scanner unit 820 and the printer unit 830 so as to perform copying to make a designated number of copies in each of the settings.

In addition, management of the number of copies for copying, and the copy settings information in the reference copy settings and the modified copy settings may be performed, for example, using a table as described with reference to FIG. 3.

The another embodiment of the invention has been described above. According to this embodiment, it is possible to satisfy various needs of the user when copying is performed to make a plurality of copies.

The embodiments of the invention are exemplary of the spirit and scope of the invention and are not to be considered as limiting. It should be understood by those skilled in the art that substitutions, remediations, and other modifications can be made.

For example, the invention may be applied to a driver program of a copying machine and a multi-function peripheral having a printer function. In addition, the invention may also be applied to a driver program of a scanner, and a driver program of a copying machine or a multi-function peripheral having a scanner function.

For example, the scanner driver may collectively receive a plurality of different settings (for example, settings of layout formats or the like) when scan data is to be output as a predetermined electronic file (for example, document data such as a PDF file), and output a plurality of the electronic files according to the plurality of the settings. The same applies to a case where a copying machine or a multi-function peripheral obtains scan data as a predetermined electronic file.

As described above, according to the embodiments of the invention, it is possible to provide a technique for satisfying various needs of users when printing or copying is performed to make a plurality of copies.

That is, according to the embodiments of the invention, the user can obtain print outputs or copy outputs in different settings per an arbitrary number of copies with an operation determined once. In addition, after designating the total number of copies for printing or copying in advance, settings can be applied to a group including an arbitrary number of copies on the same UI screen as that of the main settings, so that the user can use the UI screen without uncomfortable feeling.

In practice, when a plurality of copies are needed by printing or copying, in many cases, outputs in different formats for the purpose as well as a single format are needed. For example, when materials for a conference of dozens of people are to be prepared, the user may want to output 25 copies in two pages per sheet and two-sided color printing for distribution among attendance, 2 copies in one-sided color printing without allocation for storage, and 5 copies in two-sided monochrome printing without allocation for memos of conference organizers. In addition, for the purpose, there may be a case where the user wants to set more specific parameters such as stapler stopping, utilization classification of paper types (for example, plain paper for distribution, fine-quality paper for storage, and recycled paper for memos), insertion of date and title, and the like.

The embodiments of the invention are particularly effective in the above-mentioned cases. That is, even in the above-mentioned cases, there is no need to repeat a settings change and a print or copy instruction, so that the burden of job on the user can be reduced.

The entire disclosure of Japanese Patent Application No. 2009-093666, filed Apr. 8, 2009 is expressly incorporated by reference herein.

What is claimed is:

1. A non-transitory computer-readable recording medium having a printer driver recorded thereon, the printer driver causing a computer to operate as a computer comprising:
   a setting reception unit that displays a first user interface and receives settings of print settings, wherein when settings of a plurality of print copies are received via the first user interface, the setting reception unit displays a second user interface to receive settings for dividing the number of print copies into groups by an arbitrary number of copies per group, further wherein when an instruction for setting print settings to one of the groups is received via the second user interface, the setting reception unit displays a third user interface to receive settings of the print settings of the corresponding group; and
   a print data generation unit that generates print data according to the set print settings,
   wherein the print data generation unit generates print data according to the print settings per each of the groups set via the first, second, and third user interfaces.

2. The non-transitory computer-readable recording medium according to claim 1, wherein, when settings of a plurality of print copies are received via the first user interface, a predetermined button is set to be available, and
   when a selection of the button is received, the second user interface is displayed.

3. The non-transitory computer-readable recording medium according to claim 1, wherein the first and third user interfaces have sections for receiving the same print settings.

4. The non-transitory computer-readable recording medium according to claim 3, wherein the setting reception unit sets a reception of a predetermined part of the print settings on the third user interface to be unavailable.

5. The non-transitory computer-readable recording medium according to claim 1, wherein the setting reception unit obtains scan data as a predetermined electronic file, receives a plurality of settings for the predetermined electronic file, and wherein the print data generation unit outputs a plurality of the predetermined electronic files according to the plurality of settings.

6. A copying machine comprising:
   a setting reception unit that displays a first user interface and receives settings of copy settings, wherein when settings of a plurality of copies for copying are received via the first user interface, the setting reception unit displays a second user interface to receive settings for dividing the number of copies for copying into groups by an arbitrary number of copies per group, further wherein when an instruction for setting copy settings to one of the groups is received via the second user interface, the setting reception unit displays a third user interface to receive settings of the copy settings of a corresponding group; and
   a copy control unit that controls copying to be performed by a scanner unit and a printer unit according to the set copy settings,
   wherein the copy control unit controls copying according to the copy settings per each of the groups set via the first, second, and third user interfaces.

7. The copying machine according to claim 6, wherein the setting reception unit obtains scan data as a predetermined electronic file, receives a plurality of settings for the predetermined electronic file, and wherein the print data generation unit outputs a plurality of the predetermined electronic files according to the plurality of settings.

8. A multi-function peripheral comprising:
   a setting reception unit that displays a first user interface and receives settings of copy settings, wherein when settings of a plurality of copies for copying are received via the first user interface, the setting reception unit displays a second user interface to receive settings for dividing the number of copies for copying into groups by an arbitrary number of copies per group, further wherein when an instruction for setting copy settings to one of the groups is received via the second user interface, the setting reception unit displays a third user interface to receive settings of the copy settings of a corresponding group; and
   a copy control unit that controls copying to be performed by a scanner unit and a printer unit according to the set copy settings,
   wherein the copy control unit controls copying according to the copy settings per each of the groups set via the first, second, and third user interfaces.

9. The multi-function peripheral according to claim 8, wherein the setting reception unit obtains scan data as a predetermined electronic file, receives a plurality of settings for the predetermined electronic file, and wherein the print data generation unit outputs a plurality of the predetermined electronic files according to the plurality of settings.

* * * * *